Patented Sept. 5, 1933

1,925,232

UNITED STATES PATENT OFFICE 1,925,232

ADHESIVE AND PROCESS OF MAKING THE SAME

Morton B. Cooper, Lansdale, Pa., assignor to Perkins Glue Company, a corporation of Delaware No Drawing. Application February 21, 1930
Serial No. 430,448

4 Claims. (Cl. 87—17)

This invention relates to adhesives—more particularly to an adhesive employing casein in solution.

The usual alkaline casein glues do not possess highly waterproof characteristics. In addition such glues when employed in wood-working are more quickly absorbed by some woods than others with the result that where a wood of each kind is employed in making a joint, one wood absorbs most of the adhesive and the other absorbs very little, causing a weakened joint because of the unequal penetration of the adhesives.

An important object of this invention accordingly is to provide casein adhesives having a higher waterproofness than the usual alkaline glues of this type. Another object of the invention is to provide glues of this type which may be used with woods having different absorptive characteristics, without causing the results mentioned above, and which therefore will produce uniformly strong joints with such woods.

Other objects and advantages will be apparent from the following description.

The invention comprises the novel products as well as the novel processes and steps of processes according to which such products are manufactured, the specific embodiments of which are described hereinafter by way of example and in accordance with which I now prefer to practice the invention.

In accordance with my invention I have found that by mixing suitably prepared dried substantially insoluble blood with casein a glue having unusual waterproofness and other desirable characteristics is obtained.

The dried blood, which I prefer, may be produced by evaporating blood—such as for example the blood of horses, cows, whales, hogs, etc.—at atmospheric or near atmospheric pressure at a temperature near 100° C. The product is insoluble. It appears in commerce under the name "fertilizer blood". It differs from blood albumin, which is prepared by drying blood under vacuum at low temperatures, this product being water-soluble.

I have found that varying proportions and varying degrees of fertilizer blood may be employed to secure the results desired. The proportion of casein and other ingredients may also be varied. The following is a description of a composition which I now prefer:—

I employ 10 to 20 percent, preferably 14% of dried fertilizer blood, half of which has been ground to pass a 100 mesh sieve, and the other half of which has been ground to pass a 200 mesh sieve, in conjunction with 62% of a good commercial grade of casein or blends of same ground to pass a 60 mesh sieve, mixed with 15½% hydrated lime, 5% sodium fluoride and 3½% sodium phosphate. For convenience the above composition is tabulated as follows:—

| Casein | Fertilizer blood | | Hydrated lime | Sodium fluoride | Sodium phosphate |
|---|---|---|---|---|---|
| 62% | 10-20% preferably 14% | | 15.5% | 5% | 3.5% |
| | Pass 100 mesh sieve | Pass 200 mesh sieve | | | |
| | 50% | 50% | | | |

These ingredients are mixed dry to form the glue base in solid form, and after thorough mixing two parts of water, preferably at room temperature, is added to one part of the mixture. The resulting mixture has a viscosity of about 20 to 35 which varies according to the blends of casein involved when tested by the Stormer viscosimeter. The glue so made may be applied by any of the ordinary spreading machinery as is used in woodworking factories today; also it can be used where necessary with a common hand brush.

As noted the quantity of fertilizer blood may be varied but I prefer 10-20%. The quantity of casein may also vary from 42 to 62%. Instead of the casein solvents used, others may be employed.

I have found that when the composition made as above is applied to a joint comprising porous and non-porous wood—the glue produces a strong joint. The fertilizer blood causes less penetration into the more porous wood. The blood seems to swell and fill the pores of the latter and hinders the penetration by the remainder of the mass into these pores, although allowing sufficient penetration to form a strong joint. This joint is stronger than when the blood is omitted. On examining a joint made in this way I have found that the penetration is quite even. I have found that the coarser part of the fertilizer blood partially remains on the surface of the part being glued and when the wood is put under pressure loss of glue by being pressed out, is greatly lessened. An even glue line is thus also formed. In addition when the composition is used under pressure, particularly with panels, the tendency of the veneer to slip when the usual pressure is applied, is greatly decreased when my composition is used. The mixture of fertilizer blood with casein seems to produce a binding which effectually resists this slippage.

The glue made in accordance with the above has remarkable waterproofing properties. I have tested it according to the procedure for testing established by Forest Products Laboratory and find in accordance with those tests that it possesses higher waterproofing qualities than the same casein glue without fertilizer blood.

What I claim and desire to secure by Letters Patent is:—

1. A glue comprising a casein glue base or the like and fertilizer blood particles of varying size, preventing excessive absorption by the surfaces to which it is applied.

2. A casein glue adapted for joining surfaces of materials having different absorptive properties, which comprises a casein glue composition containing fertilizer blood composed of particles of varying size to clog the pores of the surfaces to be joined and preventing excessive absorption of the glue by said surfaces.

3. A casein glue adapted particularly for use on "starved joints", comprising a water soluble casein composition containing alkaline material together with water insoluble particles of fertilizer blood, the said particles being of varying size and serving to clog the pores in the surfaces to be joined, thus preventing absorptive action of the said surfaces.

4. A process for the preparation of glue, which comprises glutinizing casein or the like with a glutinizing agent, to produce a glue having swelling action upon fertilizer blood particles, and combining with the glutinized material, fertilizer blood particles of varying size adapted to clog the pores of surfaces to be joined by the glue product.

MORTON B. COOPER.